(12) United States Patent
Decurninge et al.

(10) Patent No.: US 10,700,750 B2
(45) Date of Patent: Jun. 30, 2020

(54) UNIT-NORM CODEBOOK DESIGN AND QUANTIZATION

(71) Applicant: HUAWEI TECHNOLOGIES CO., LTD., Shenzhen, Guangdong (CN)

(72) Inventors: Alexis Decurninge, Boulogne Billancourt (FR); Maxime Guillaud, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/270,505

(22) Filed: Feb. 7, 2019

(65) Prior Publication Data

US 2019/0173552 A1    Jun. 6, 2019

Related U.S. Application Data

(63) Continuation of application No. PCT/EP2016/069065, filed on Aug. 10, 2016.

(51) Int. Cl.
*H04B 7/06*        (2006.01)
*H04L 25/03*     (2006.01)
(Continued)

(52) U.S. Cl.
CPC ......... *H04B 7/0626* (2013.01); *H04B 7/0478* (2013.01); *H04B 7/0663* (2013.01); *H04L 5/0048* (2013.01); *H04L 25/0391* (2013.01)

(58) Field of Classification Search
CPC .. H04B 7/0478; H04B 7/0626; H04B 7/0663; H04L 5/0048
(Continued)

(56) References Cited

U.S. PATENT DOCUMENTS 8,396,163 B2    3/2013  Collings et al.
8,638,874 B2    1/2014  Heath, Jr. et al.
(Continued)

FOREIGN PATENT DOCUMENTS

CN        1969522 A      5/2007
CN      102081926 A      6/2011
(Continued)

OTHER PUBLICATIONS

Christian Rohlfing et al: "Logarithmic Cubic Vector Quantization:Concept and analysis", Information Theory and Its Applications (ISITA), 2012 International Symposium on, IEEE, Oct. 28, 2012, pp. 294-298, XP032297182.
(Continued)

*Primary Examiner* — Emmanuel Bayard
(74) *Attorney, Agent, or Firm* — Fish & Richardson P.C.

(57) ABSTRACT

The disclosure relates to an encoder for encoding a vector comprising channel state information and/or a pilot sequence. The encoder includes at least one processor; and a non-transitory computer-readable storage medium coupled to the at least one processor and storing programming instructions for execution by the at least one processor, wherein the programming instructions instruct the at least one processor to: determine a cell of a sphere mesh, wherein the cell includes the vector; determine a refined sphere mesh based on an initial sphere mesh; and determine a binary representation of a first identifier of an initial cell of the initial sphere mesh that includes the vector and a second identifier of a refined cell of the refined sphere mesh that includes the vector.

20 Claims, 7 Drawing Sheets

(51) Int. Cl.
*H04B 7/0456* (2017.01)
*H04L 5/00* (2006.01)

(58) Field of Classification Search
USPC .................................................. 375/260, 262
See application file for complete search history.

(56) References Cited

U.S. PATENT DOCUMENTS

| | | | |
|---|---|---|---|
| 2005/0281350 | A1 | 12/2005 | Chae et al. |
| 2009/0305693 | A1* | 12/2009 | Shimomura ........ H04W 74/004 455/422.1 |
| 2011/0137645 | A1 | 6/2011 | Vary et al. |
| 2012/0259644 | A1 | 10/2012 | Lin et al. |
| 2013/0002670 | A1* | 1/2013 | Kikuta .................... G06T 15/04 345/420 |
| 2013/0271463 | A1* | 10/2013 | Curington ............... G06T 17/05 345/420 |
| 2014/0169421 | A1 | 6/2014 | Tosato |
| 2014/0185716 | A1 | 7/2014 | Aubert |
| 2014/0253118 | A1* | 9/2014 | Koay ................. G01R 33/4826 324/309 |
| 2019/0297505 | A1* | 9/2019 | Zasowski .............. H04W 16/24 |

FOREIGN PATENT DOCUMENTS

| | | |
|---|---|---|
| CN | 102132494 A | 7/2011 |
| CN | 102571172 A | 7/2012 |
| CN | 103548310 A | 1/2014 |
| EP | 2343837 A1 | 7/2011 |
| JP | 2010021998 A | 1/2010 |

OTHER PUBLICATIONS

Kim Jee Hyun et al: "Efficient Feedback via Subspace-Based Channel Quantization for Distributed Cooperative Antenna Systems withTemporally Correlated Channels", EURASIP Journal on Advances in Signal Processing, Hindawi Publishing Corp, US, vol. 2008, Dec. 1, 2007, XP002527506, 14 pages.
Murthy C R et al: "Multiple Antenna Systems with Finite Rate Feedback", Military Communications Conference, 2005. MILCOM 2005, Oct. 17, 2005, XP010901588, 8 pages.
D Nagajyothi et al: "Overview of Different Variations of Vector Quantization Schemes and Algorithms", IOSR Journal of VLSI and Signal Processing, Jun. 1, 2016, pp. 48-59, XP055365960.
3GPP TS 36.213 V13.2.0 (Jun. 2016), 3rd Generation Partnership Project;Technical Specification Group Radio Access Network;Evolved Universal Terrestrial Radio Access (E-UTRA);Physical layer procedures(Release 13), 381 pages.
"Federico Boccardi et al, Hierarchical Quantization and Its Application to Multiuser Eigenmode Transmissions for MIMO Broadcast Channels WithLimited Feedback. The 18th Annual IEEE International Symposium on Personal, Indoor and Mobile Radio Communications (PIMRC'07), 2007, 5 pages".
Robert W. Heath Jr et al, Progressive Refinement for High Resolution Limited Feedback Multiuser MIMO Beamforming. Asilomar 2008, 5 pages.
Daniel J. Ryan et al, QAM Codebooks for Low-Complexity Limited Feedback MIMO Beamforming. 2007 IEEE, 6 pages.
International Search Report and Written Opinion issued in International Application No. PCT/EP2016/069065 dated May 8, 2017, 14 pages.
Office Action issued in Japanese Application No. 2019-507323 dated Mar. 10, 2020, 17 pages. (with English translation).
Office Action issued in Chinese Application No. 201680088295.X dated Apr. 20, 2020, 38 pages (with English translation).

* cited by examiner

UNIT-NORM CODEBOOK DESIGN AND QUANTIZATION

CROSS-REFERENCE TO RELATED APPLICATIONS

This application claims is a continuation of International Application No. PCT/EP2016/069065, filed on Aug. 10, 2016, the disclosure of which is hereby incorporated by reference in its entirety.

TECHNICAL FIELD

Embodiments disclosed herein relate to related to encoding and/or decoding channel state information (CSI) and/or pilot sequences. In particular, the present invention relates to an encoder for encoding a vector comprising channel state information and/or a pilot sequence. The present invention also relates to a decoder for decoding a vector comprising channel state information and/or a pilot sequence from a binary representation. Further, the present invention also relates to a communication system and to methods for decoding and/or encoding channel state information and/or pilot sequences. The present invention also relates to a computer-readable storage medium storing program code, the program code comprising instructions for carrying out the above methods.

BACKGROUND

In order to feed back channel state information over the air from a User Equipment to a Base Station, it needs to be quantified and the quantized CSI needs to be mapped into a sequence of bits. The feedback can be performed between any two communicating devices (e.g. feedback between two user equipments, between two base stations, etc.). The terminology "Base Station" (BS) and "User Equipment" (UE) will be used in the following merely for the sake of simplicity.

The User Equipment knows a CSI vector "h0" through some non-precise process and wants to feed back a normalized version of this vector denoted by "h" to the base station.

The size of the vector "h" (denoted by "D" in the following) can e.g. correspond to the number of antennas of the Base Station. Since the UE cannot send h with infinite precision, it has to send a "compact" representation of this vector "h". This feedback is performed by transmitting a sequence of B bits (b1, . . . , bB) representing an approximation of "h" to the Base Station.

Current standardized codebooks are only available for low dimensions (small B) and low number of bits (small B). Some automatic designs have been proposed for large dimension. However, their performance and/or their complexity can be suboptimal.

SUMMARY OF THE INVENTION

The objective of the present invention is to provide an encoder, a decoder, a communication system and a method which overcome one or more of the above-mentioned problems of the prior art.

A first aspect of the invention provides an encoder for encoding a vector comprising channel state information and/or a pilot sequence, the encoder comprising:
a determining unit configured to determine a cell of a sphere mesh, wherein the cell includes the vector,
a mesh refinement unit configured to determine a refined sphere mesh based on an initial sphere mesh, and
a representation unit configured to determine a binary representation of a first identifier of an initial cell of the initial sphere mesh that includes the vector and a second identifier of a refined cell of the refined sphere mesh that includes the vector.

The encoder of the first aspect has the advantage that the encoding has a low complexity while still achieving a high coding efficiency.

The determining unit can be configured to determine the initial cell of the initial sphere mesh and to determine the refined cell of the refined sphere mesh. Thus, the new (refined) sphere mesh comprises the initial sphere mesh, wherein only the initial cell has been further refined. Alternatively, the refined sphere mesh is only the initial sphere mesh, wherein only the initial cell has been further refined.

The encoder of the first aspect can be configured to first determine an initial sphere mesh. For example, it can comprise an initial mesh unit configured to determine the initial sphere mesh. In particular, the initial sphere mesh can be built based on knowledge that is shared between user equipment and base station, e.g. based on covariance information of the channel state information.

Typically, the vector comprising the channel state information is a unit-norm vector. The first and/or second identifiers can be indices.

The encoder of the first aspect addresses the problem of efficient quantization. For example, it can be used for feedback between two multiple-antennas communicating devices of a unit-norm vector representing a "part" of the Channel State Information. In the following, we will not distinguish between the unit-norm vector and the CSI when there is no ambiguity.

In a first implementation of the encoder according to the first aspect, the mesh refinement unit is configured to determine the refined sphere mesh by iteratively splitting a cell of the initial sphere mesh.

This represents an efficient way of determining the refined sphere mesh with the desired accuracy. Preferably, the splitting is performed only for the initial cell of the initial sphere mesh. For example, a cell can be split into two cells. Thus, an initial sphere mesh can be recursively further refined.

In a second implementation of the encoder according to the first aspect as such or according to the first implementation of the first aspect, the mesh refinement unit is configured to determine the refined sphere mesh by defining a grid on a cell of the initial sphere mesh.

This represents a further efficient way of determining the refined sphere mesh. Preferably, this is performed only for the initial cell of the initial sphere mesh. Preferably, the same grid is applied to all cells of the initial sphere mesh.

In a third implementation of the encoder according to the first aspect as such or according to any of the preceding implementations of the first aspect, the vector is a complex-valued vector and the initial sphere mesh is a sphere mesh on a complex-valued sphere.

Thus, cells of the complex-valued sphere mesh can directly represent complex-valued vectors.

In a fourth implementation of the encoder according to the first aspect as such or according to any of the preceding implementations of the first aspect, the vector is a real-valued vector that is determined by a vector conversion unit based on a complex input vector.

In a fifth implementation of the encoder according to the first aspect as such or according to any of the preceding implementations of the first aspect, the encoder is configured to determine a binary representation for each of a plurality of vectors comprising channel state information and/or pilot sequences corresponding to a plurality of antennas of a multiple-antenna user equipment.

Thus, the encoder can be used for transmitting channel state information and/or pilot sequences of multiple-antenna user equipment.

In a sixth implementation of the encoder according to the first aspect as such or according to any of the preceding implementations of the first aspect, the encoder further comprises a transmission unit configured to transmit the binary representation over a wireless connection.

For example, the encoder can be part of a user equipment or a base station of a wireless communication system. Since the encoder can provide a suitable binary representation with low computational effort, the encoder is particularly useful for mobile devices which have limitations on energy consumption and/or computational processing power.

A second aspect of the invention refers to a decoder for decoding a vector comprising channel state information and/or a pilot sequence from a binary representation, the decoder comprising:
an initial vector unit configured to determine an initial cell vector based on a first part of the binary representation,
a mesh refinement unit configured to determine a refined sphere mesh based on an initial sphere mesh, and
a refined vector unit configured to determine a refined cell vector based on the refined sphere mesh and a second part of the binary representation.

The decoder can be configured to decode the binary representation determined by the encoder of the first aspect. The refined vector unit can be configured to determine the refined cell vector based on the refined sphere mesh as determined by the mesh refinement unit.

In a first implementation of the decoder of the second aspect, the mesh refinement unit is configured to:
determine the refined sphere mesh by iteratively splitting a cell of the initial sphere mesh into two cells, and/or
determine the refined sphere mesh by defining a grid on a cell of the initial sphere mesh.

In particular, the mesh refinement unit can be configured to split the initial cell into two cells, and then to iteratively split the two cells into four cells, eight cells, and so on. Preferably, the cells are not all effectively computed, but the splitting of cells is effective only for the cells containing the input vectors. The mesh refinement unit can be configured to determine one of the two cells resulting from the splitting of the cell of the initial sphere mesh, then to determine one of the two cells resulting from the splitting of the first determined cell and so on.

The mesh refinement unit can thus successively increase the accuracy until the desired accuracy is reached.

The mesh refinement unit can also be configured to define a grid on a cell of the initial sphere mesh, e.g. on the initial cell of the initial sphere mesh. This has the advantage that in one step the desired accuracy level can be reached.

A third aspect of the invention refers to a communication system comprising:
a first node comprising an encoder as such or according to any of the preceding implementations of the first aspect, and
a second node comprising a decoder as such or according to any of the preceding implementations of the second aspect.

The first node can comprise a transmitter configured to transmit the binary representation that is determined by the encoder. The second node can comprise a receiver configured to receive the binary representation that is transmitted by the first node.

A fourth aspect of the invention refers to a method for encoding a vector comprising channel state information and/or a pilot sequence, the method comprising:
determining an initial cell of an initial sphere mesh, wherein the initial cell includes the vector,
refining the initial sphere mesh to obtain a refined sphere mesh,
determining a refined cell of the refined sphere mesh that includes the vector, and
representing a first identifier of the initial cell and a second identifier of the refined cell as a binary representation.

The methods according to the fourth aspect of the invention can be performed by the encoder according to the first aspect of the invention. Further features or implementations of the method according to the fourth aspect of the invention can perform the functionality of the encoder according to the first aspect of the invention and its different implementation forms.

In a first implementation of the method of the fourth aspect, refining the initial sphere mesh comprises iteratively splitting cells of the initial sphere mesh.

In a second implementation of the method of the fourth aspect as such or according to any of the preceding implementations of the third aspect, the vector is a real-valued vector and the method comprises an initial step of converting a complex input vector into the real-valued vector.

A fifth aspect of the invention refers to a method for decoding a vector comprising channel state information and/or a pilot sequence from a binary representation, the method comprising:
determining an initial cell vector based on a first part of the binary representation and an initial sphere mesh,
determining a refined sphere mesh based on the initial sphere mesh, and
determining a refined cell vector based on the refined sphere mesh and a second part of the binary representation.

The methods according to the fifth aspect of the invention can be performed by the decoder according to the second aspect of the invention. Further features or implementations of the method according to the fifth aspect of the invention can perform the functionality of the decoder according to the second aspect of the invention and its different implementation forms.

A sixth aspect of the invention refers to a computer-readable storage medium storing program code, the program code comprising instructions for carrying out the method of the fourth aspect, one of the implementations of the fourth aspect, the fifth aspect, or one of the implementations of the fifth aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention. Modifications on these embodiments are possible without departing from the scope of the present invention as defined in the claims.

DETAILED DESCRIPTION OF THE EMBODIMENTS

Figure 1:
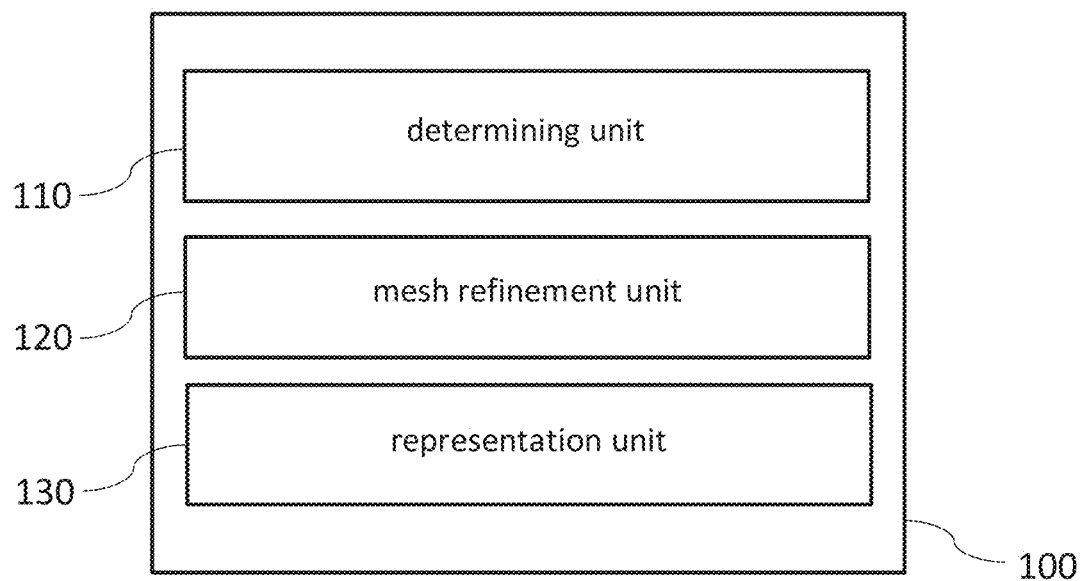
FIG. 1 is a block diagram illustrating an encoder in accordance with an embodiment of the present invention.

FIG. 1 shows an encoder 100 for encoding a vector comprising channel state information and/or a pilot sequence. The encoder comprises a determining unit 110, a mesh refinement unit 120 and a representation unit 130. The encoder 100 can be realized for example on a processor of a base station or a user equipment (not shown in FIG. 1).

The determining unit 110 is configured to determine a cell of a sphere mesh, wherein the cell includes the vector. For example, the determining unit 110 can be configured to determine an initial cell of an initial sphere mesh, wherein the initial cell includes the vector. The determining unit 110 can further be configured to determine a refined cell of a refined sphere mesh, wherein the refined cell includes the vector.

The mesh refinement unit 120 is configured to determine a refined sphere mesh based on an initial sphere mesh.

The representation unit 130 is configured to determine a binary representation of a first identifier of an initial cell of the initial sphere mesh that includes the vector and a second identifier of a refined cell of the refined sphere mesh that includes the vector.

Figure 2:
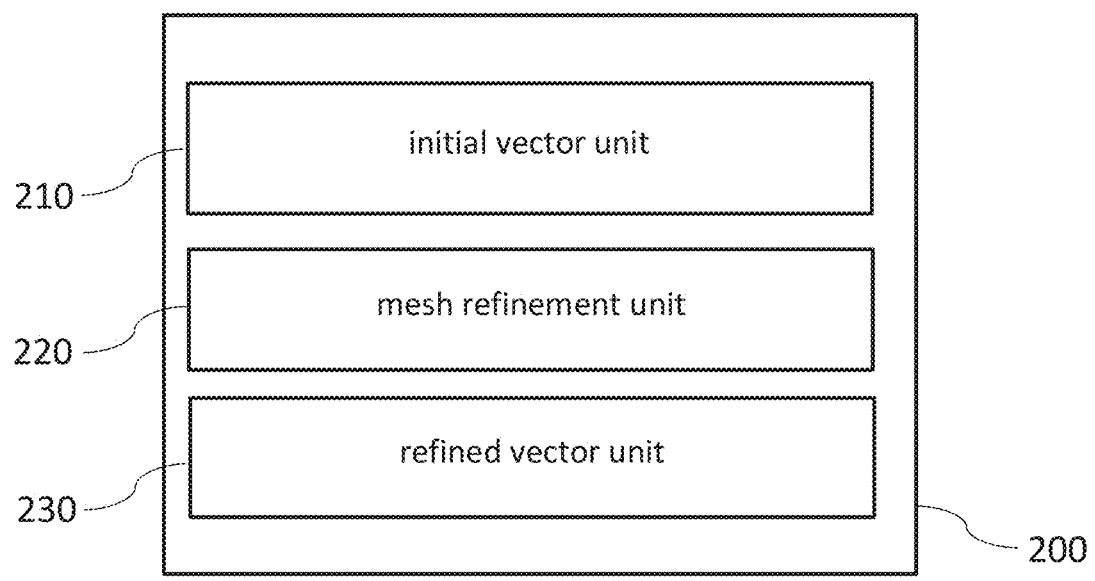
FIG. 2 is a block diagram illustrating a decoder in accordance with a further embodiment of the present invention.

FIG. 2 shows a decoder 200 for decoding a vector comprising channel state information and/or a pilot sequence from a binary representation.

The decoder comprises an initial vector unit 210, a mesh refinement unit 220 and a refined vector unit 230.

The initial vector unit 210 is configured to determine an initial cell vector based on a first part of the binary representation and an initial sphere mesh. The initial sphere mesh can be predetermined sphere mesh, e.g. stored in a memory of the decoder.

The mesh refinement unit 220 is configured to determine a refined sphere mesh based on the initial sphere mesh.

The refined vector unit 230 is configured to determine a refined cell vector based on the refined sphere mesh and a second part of the binary representation.

Figure 3:
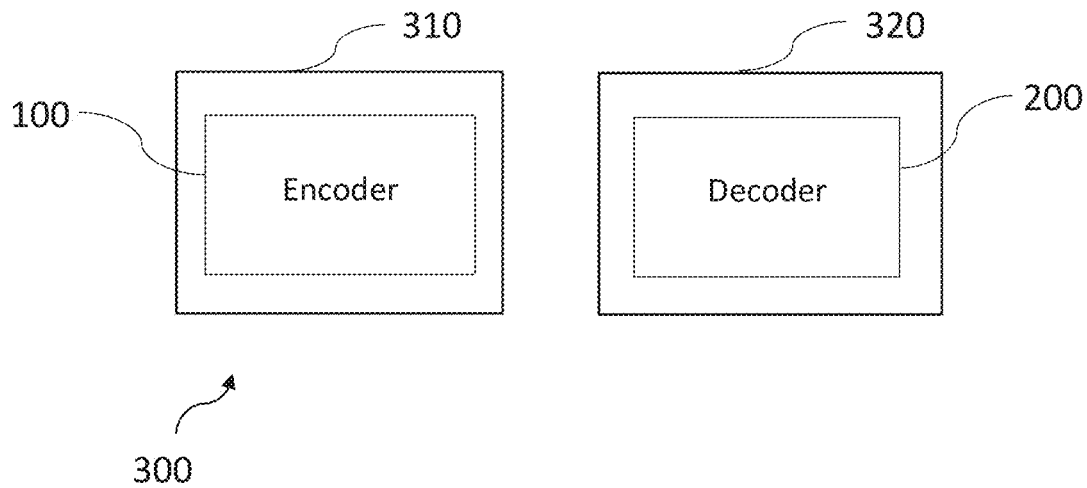
FIG. 3 is a block diagram illustrating a system in accordance with a further embodiment of the present invention.

FIG. 3 shows a communication system 300 comprising a first node 310 and a second node 320.

The first node 310 comprises an encoder 100, e.g. the encoder 100 of FIG. 1. The second node 320 comprises a decoder 200, e.g. the decoder 200 of FIG. 2.

Figure 4:
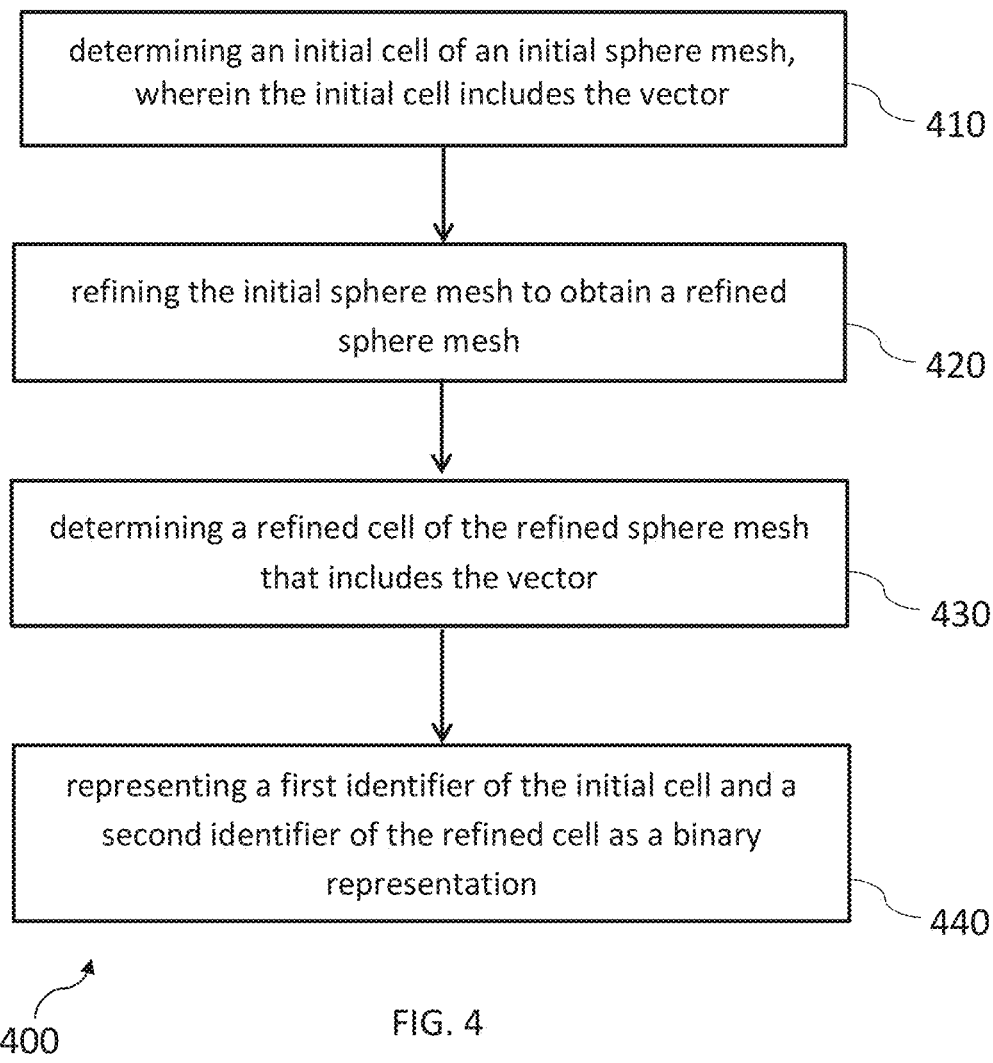
FIG. 4 is a flow chart of a method for encoding a vector in accordance with a further embodiment of the present invention.

FIG. 4 shows a method for encoding a vector comprising channel state information and/or pilot sequence. The method comprises a first step 410 of determining an initial cell of an initial sphere mesh, wherein the initial cell includes the vector.

The method comprises a second step 420 of refining the initial sphere mesh to obtain a refined sphere mesh.

The method comprises a third step 430 of determining a refined cell of the refined sphere mesh that includes the vector.

The method comprises a fourth step 440 of representing a first identifier of the initial cell and a second identifier of the refined cell as a binary representation. The method 400 can be carried out e.g. by the encoder 100 of FIG. 1. The method 400 can for example be carried out by an encoder 100 located at a UE.

Suppose that a non-precise process leads the UE to know a $D_0$-dimensional vector comprising the channel state information, wherein $D_0$ is the number of antennas at the base station, the vector denoted by $h_0$. $h_0$ may refer for example to a tap in the time domain of the channel between all $D_0$ antennas of Base Station and the antenna of UE.

The fact that the CSI is represented only as a vector (and not a matrix) is due to the assumption that the UE has a single antenna. This assumption is done for the sake of simplicity. If the UE has multiple antennas, one can use the single-antenna case as detailed further below.

The UE can compute a unit-norm vector h from $h_0$ representing e.g. a part of the channel state information.

In a first embodiment, the unit-norm vector h can be computed as:

$$h = \frac{h_0}{\|h_0\|}$$

In that case the dimension of the vector h is $D=D_0$.

In a second embodiment, h can be computed as:

$$h = \frac{U^H h_0}{\|U^H h_0\|}$$

where U is a $D_0 \times D$ unitary matrix. The dimension of h is then equal to D.

A third embodiment may be considered through another scenario. A base station may be configured to compute a complex vector representing a pilot sequence P that another communication device (for example, a user equipment) should transmit. In that case, the pilot sequence needs to be quantized, that is to say represented through bits in order that these bits can be transmitted to the communication device. In that case, the unit vector can be the normalized version of this pilot:

$$h = \frac{p}{\|p\|}$$

The task of the encoder can be to compute a binary representation, e.g. a sequence of bits (b1, ..., bB), representing a unit-norm vector "h".

We use the notion of codebook as a list of representative vectors approximating the true vector "h". Herein, a codebook is a list of vectors (or codewords denoted by v(1), ..., v($2^B$)) on the sphere that can be sent over the air through the binary representation of their index (comprised between 1 and $2^B$).

Figure 5:
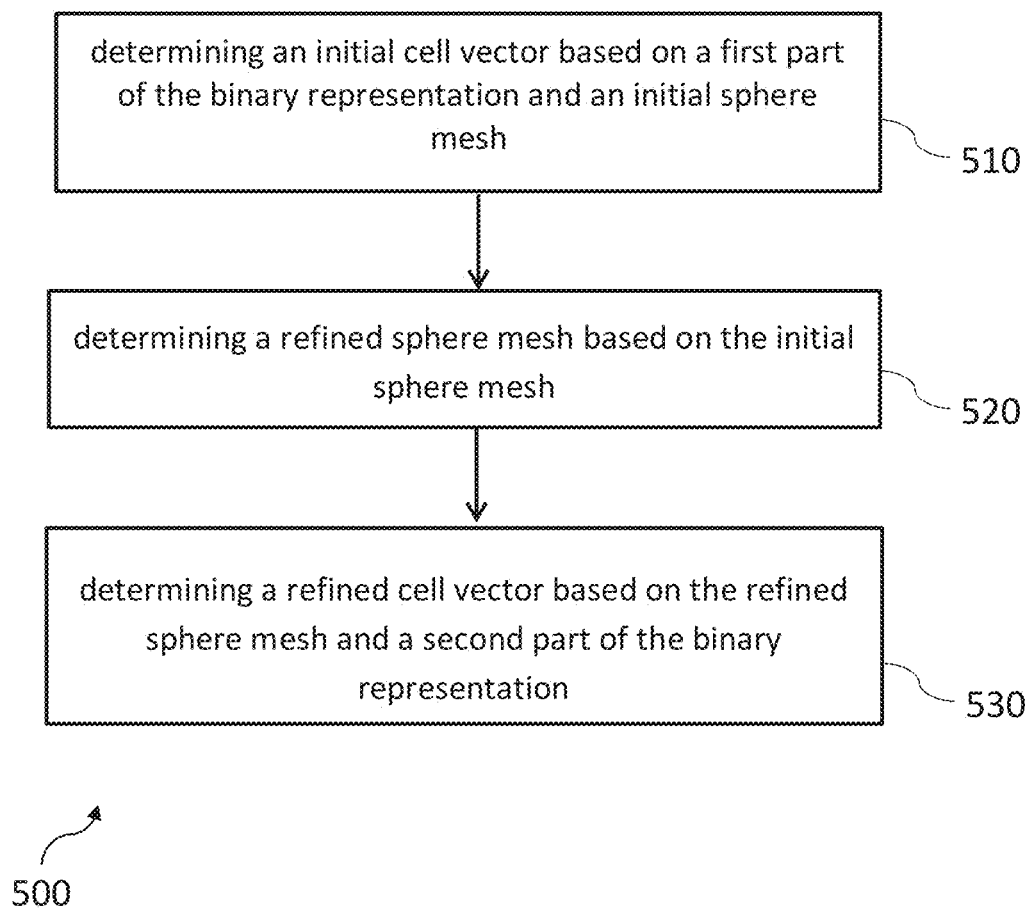
FIG. 5 is a flow chart of a method for decoding a vector in accordance with a further embodiment of the present invention.

FIG. 5 shows a method 500 for decoding a vector comprising channel state information and/or a pilot sequence from a binary representation.

The method 500 comprises a first step 510 of determining an initial cell vector based on a first part of the binary representation and an initial sphere mesh.

The method 500 comprises a second step 520 of determining a refined sphere mesh based on the initial sphere mesh.

The method 500 comprises a third step 530 of determining a refined cell vector based on the refined sphere mesh and a second part of the binary representation.

Figure 6:
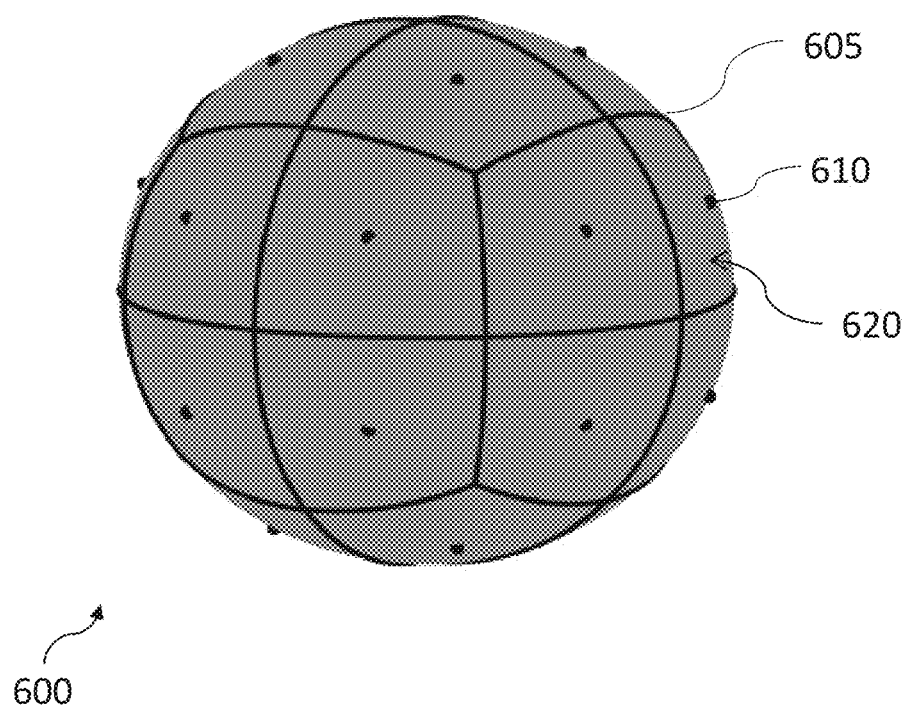
FIG. 6 is a schematic illustration of codebooks on a sphere in accordance with a further embodiment of the present invention.

FIG. 6 is an illustration of a codebook on a sphere 600. The black dots 610 indicate the codewords 610 while the cells 620 are the set of the closest points on the sphere to each codeword 610.

The mesh of the sphere can then be seen as a set of vectors of the sphere 600 closest to each codeword 610. One can then equivalently either define the codewords 610 and compute the mesh 605 related to these codewords 610 or design the mesh 605 and consider the center of each cell 620 of the mesh 605 as a codeword. Once these codewords 610 (or this mesh 605) are defined, the encoder can consider the "vector to be quantized" (the unit-norm vector h) and find the closest codeword to this vector (namely "quantized vector" which is then an approximation of the true vector h). The binary representation of the index of this "quantized vector" can then be sent to decoder, e.g. a base station.

Figure 7:
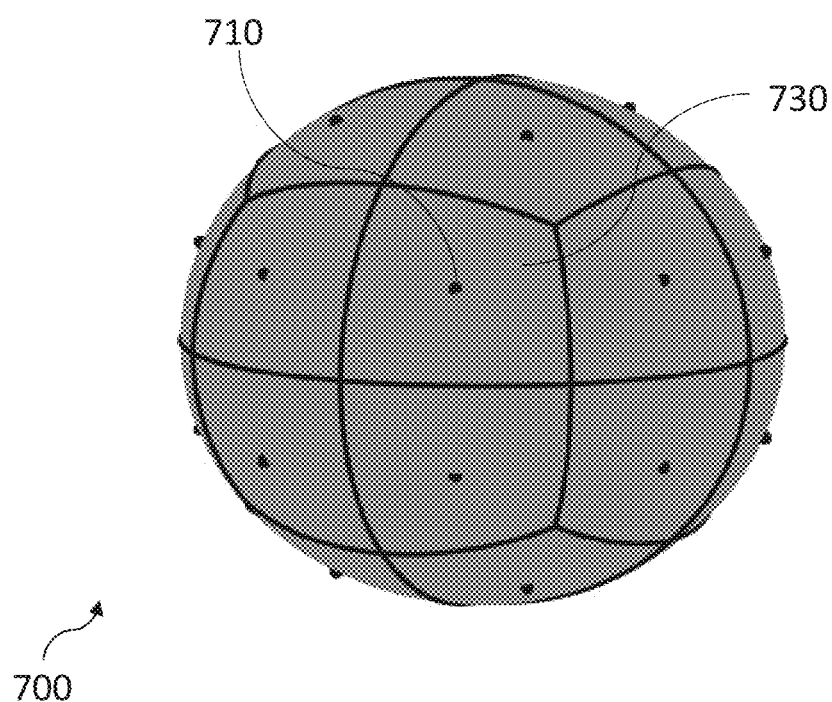
FIG. 7 is a schematic illustration of the computation of the representative vector in accordance with a further embodiment of the present invention.

FIG. 7 is a schematic illustration of the computation of the representative vector. The normalized CSI to be quantized is indicated by a dot 730 on sphere 700. The aim of an encoder is to compute a representative vector, denoted by "quantized vector" 710. To each representative vector corresponds a unique index, a binary representation of which can be sent as feedback.

A proposed encoder numerically computes a sequence of bits from a unit-norm CSI vector (denoted above by h). We will propose in next section three different preferred embodiments of the following major steps:

Step 1: Compute a real representative of h (only for first two embodiments). For example, by noting $\varphi=\arg(h_1)$ the angle of the first coordinate of h, one can define a rotated equivalent vector $h^{(r)}$ as $h^{(r)}=he^{-i\varphi}$ and we convert $h^{(r)}$ into a unit-norm real vector:

$$g = \begin{pmatrix} \mathrm{Re}(h_1^{(r)}) \\ \vdots \\ \mathrm{Re}(h_D^{(r)}) \\ \mathrm{Im}(h_2^{(r)}) \\ \vdots \\ \mathrm{Im}(h_D^{(r)}) \end{pmatrix}.$$

In the following, d will denote the size of g (that is to say d=2D-1).

Step 2: Compute an initial representative vector and its corresponding index as well as its binary representation; this constitutes the first bits of the sent sequence.

Step 3: Compute the remaining bits defining the relative position of the codeword with respect to the initial representative vector.

Figure 8A:
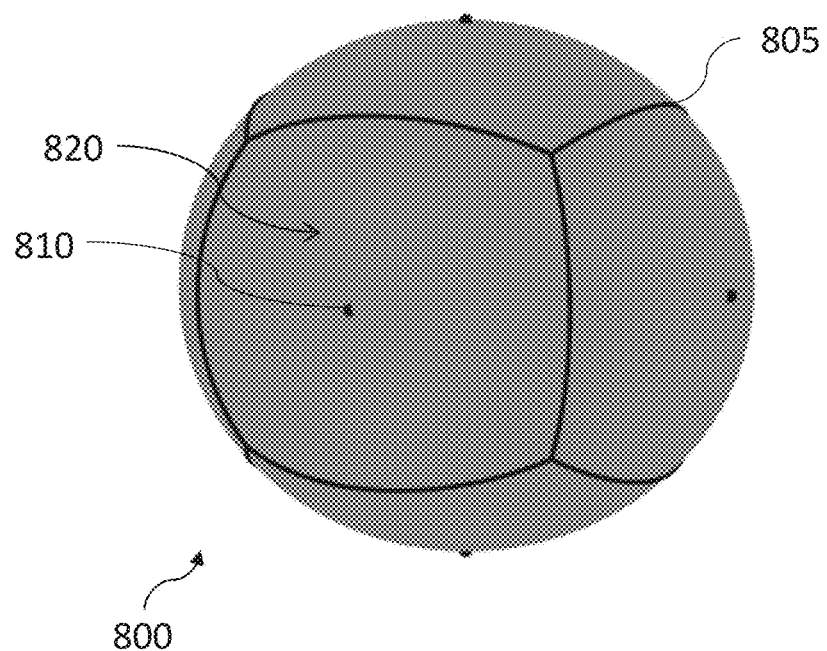
FIG. 8a is a schematic illustration of the initial mesh on a sphere in accordance with a further embodiment of the present invention.

In a first preferred embodiment, an initial mesh is iteratively divided on the sphere by cutting in two parts each cell of the mesh. FIG. 8a is a schematic illustration of the initial mesh 805 on a sphere 800.

The definition of the initial mesh can be constituted by d codewords (v(1), ..., v(d)) of coordinates v(1)=(1, 0, 0, 0, ...), v(2)=(0, 1, 0, 0, ...), ... v(d)=(0, 0, ..., 0, 1).

In the initial mesh, the index of the cell 820 containing g is computed through:

$i^* = \arg\max(|g_1|, \ldots, |g_d|).$

The d cells of the mesh are the set of points closest to each codeword. The idea is to iteratively split these cells. The division of a cell 820 into two cells 822, 824 can be performed with respect to a plan whose equation depends on the cell. The two new cells 822, 824 correspond to two new codewords 812, 814.

It is not necessary for the encoder to build all the cells of the refined mesh. It can be sufficient to iteratively find the refined cell among the two cells obtained by splitting the initial cell 820.

Figure 8B:
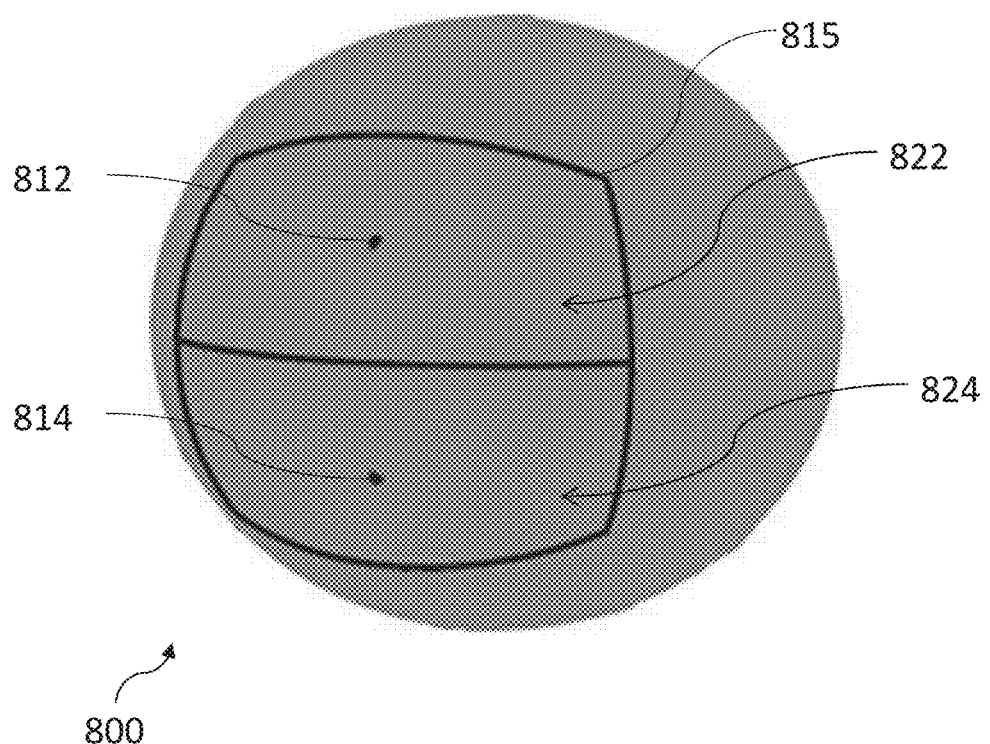
FIG. 8b is a schematic illustration of the first split of a cell of the initial mesh of FIG. 8a in accordance with a further embodiment of the present invention.

FIG. 8b is a schematic illustration of the first split of the cell 820 of the initial mesh 805 of FIG. 8a, thus yielding refined sphere mesh 815. Note that in this case the refined sphere mesh 815 omits those cells of the initial sphere mesh 805 that do not comprise the input vector.

Each split then multiplies the total number of codewords in the codebook by 2. With this method, we are able to define codebooks with different size (the number of codewords depends on the number of splits in the construction). The construction method also provides a way to compute the representative codeword. The idea is that at each step (that is to say at each split) of the codebook construction, we identify the cell in which the "vector to be quantized" belongs.

In a second preferred embodiment, a grid is built on the initial cell, which is defined as the cell in the initial mesh considered in FIG. 8a, which includes the input vector.

Figure 8C:
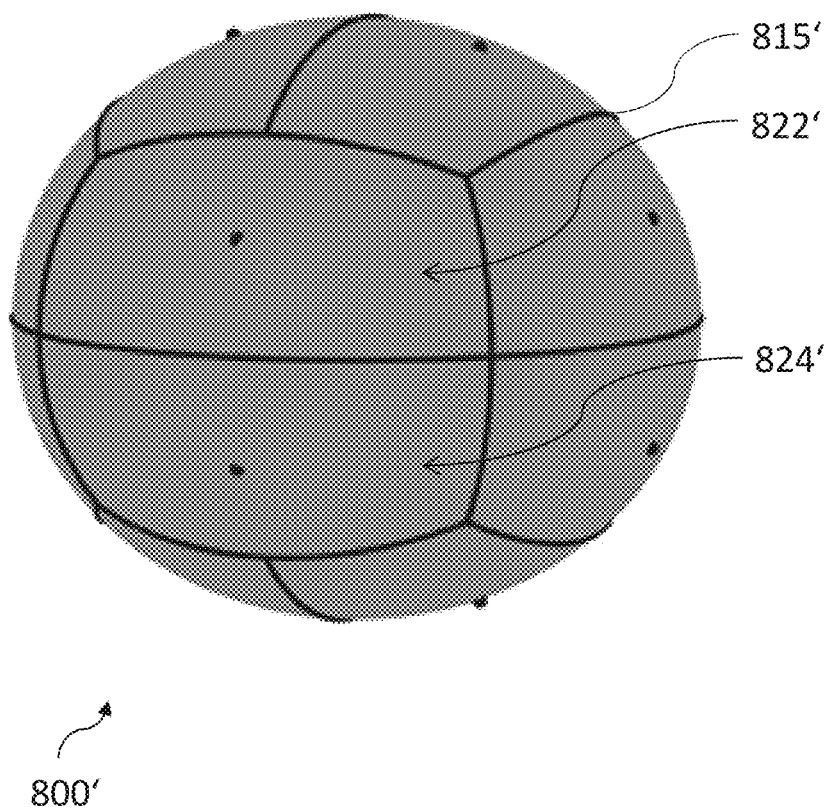
FIG. 8c is a schematic illustration of a further sphere, where all cells of an initial sphere mesh have been split in accordance with a further embodiment of the present invention.

FIG. 8c is a schematic illustration of a further sphere 800', where all cells of an initial sphere mesh have been split into two cells, e.g. using the grid. This yields a refined sphere mesh 815'. The cells of the refined sphere mesh 815' include two cells 822', 824' that refine an initial cell of the initial sphere mesh.

For each cell of the initial mesh, we are able to define an abstract mapping between each cell and the unit (d−1)-dimensional cube. Let $C_{i^*}$ be the initial cell computed at step 2. We define a mapping $T_{i^*}$ between $C_{i^*}$ and the unit cube by:

$T_{i^*}: C_{i^*} \to [0;1]^{d-1}$ $g=(g_1, \ldots, g_d)^T \mapsto (u_1, \ldots, u_{d-1})^T$ with for any $1 \le i \le d-1$ $$\begin{cases} u_i = \frac{2}{\pi}\tan^{-1}\left(\frac{g_i}{g_{i^*}}\right) + \frac{1}{2} & \text{for } i < i^* \\ u_i = \frac{2}{\pi}\tan^{-1}\left(\frac{g_{i+1}}{g_{i^*}}\right) + \frac{1}{2} & \text{for } i \ge i^* \end{cases}.$$

One then defines a regular grid on this unit cube. The sent sequence of bits in Step 3 is then the binary representation of the closest point on this grid (the representative codeword on the sphere is then the inverse mapping of this closest point), i.e. the concatenation of the binary representation of $$\left\lfloor 2^{B_i} u_i - \frac{1}{2} \right\rfloor$$

where $B_i$ is the number of bits used to quantize $u_i$.

Figure 9:
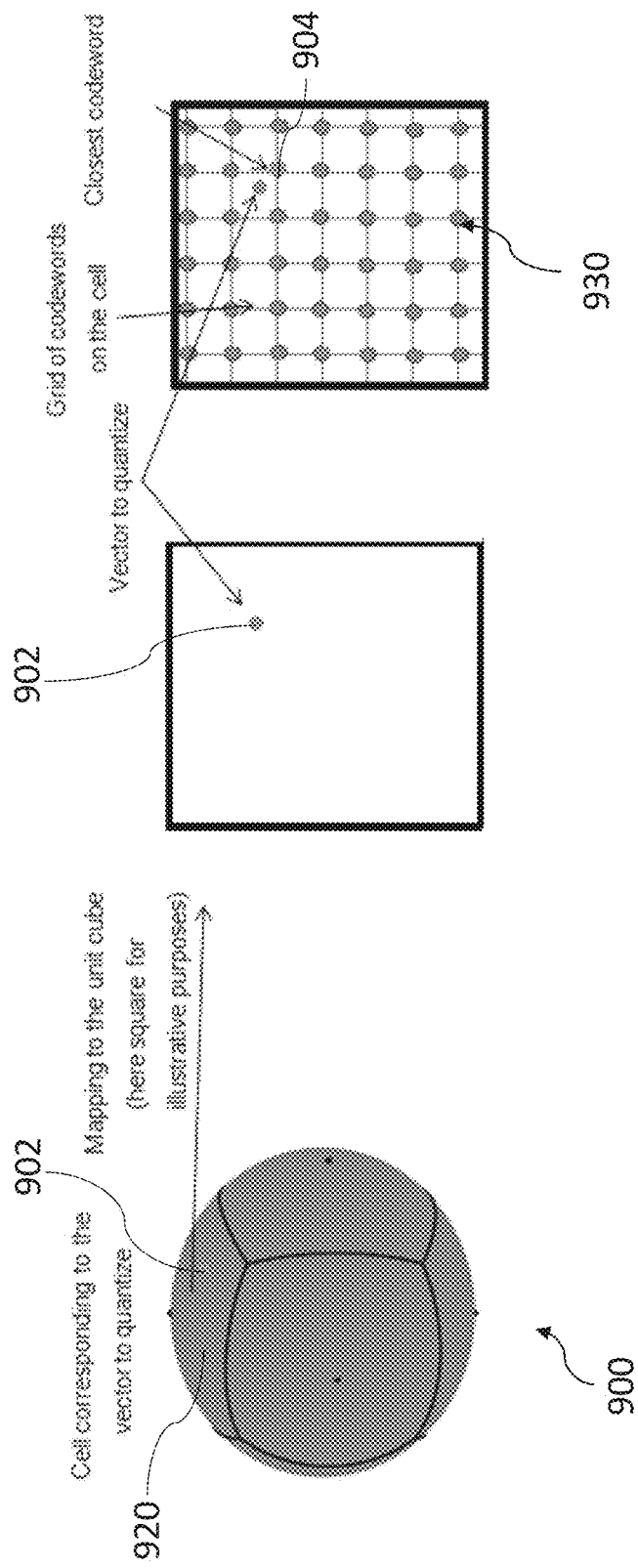
FIG. 9 is a schematic illustration of the mapping to the unit-cube and subsequent quantization in accordance with a further embodiment of the present invention.

In a third preferred embodiment, a grid 930 is built on each cell 920 of the initial mesh considered in FIG. 8*a*, but directly for the complex sphere 900. FIG. 9 is a schematic illustration of the mapping to the unit-cube and subsequent quantization. The index which binary representation will be sent is then the index of the point 904 on the grid of points 930, which is closest to the vector 902 to be quantized.

This leads to the definition of a different mapping from the initial cell to the unit cube. The remaining steps are the same as in the third embodiment. More precisely, the index of the initial cell is computed as:

$$i^* = \arg\max(|h_1|, \ldots, |h_D|)$$

and if $C_{i^*}$ is this initial cell computed at step 2, the mapping $S_{i^*}$ used at Step 3 is defined by:

$$S_{i^*}: C_{i^*} \to [0;1]^{2D-2}$$

$$x = (h_1, \ldots, h_D)^T \mapsto a = (u_1, v_1, \ldots, u_{D-1}, v_{D-1})^T$$

with for any $1 \leq i \leq D-1$, $u_i = N(\text{Re}(w_i))$ and $v_i = N(\text{Im}(w_i))$ (where N is the cumulative distribution function of the univariate standard Gaussian distribution) and $$\begin{cases} w_i = \sqrt{2} \log\left(\frac{1}{1-r_i}\right)^{1/2} \frac{h_i}{h_{i^*}} \left|\frac{h_{i^*}}{h_i}\right| & \text{for } i < i^* \\ w_i = \sqrt{2} \log\left(\frac{1}{1-r_i}\right)^{1/2} \frac{h_{i+1}}{h_{i^*}} \left|\frac{h_{i^*}}{h_{i+1}}\right| & \text{for } i \geq i^* \end{cases}$$

and $$r_i = \frac{1}{1 - 1/\sqrt{2}} \left(1 - \cos\left(\tan^{-1}\left|\frac{h_i}{h_{i^*}}\right|\right)\right).$$

Finally the sent sequence of bits is the concatenation of the concatenation of the binary representation of $$\left\lfloor 2^{B_i} a_i - \frac{1}{2} \right\rfloor$$

where $B_i$ is the number of bits used to quantize $a_i$, the i-th component of vector a.

A decoder is configured to perform a reverse operation to the above-described operation of the encoder. It computes the representative vector from a sequence of bits. For example, a decoder can be configured to, in a first step, compute the codeword index form the sequence of bits. In a second step, it can compute the codeword associated to this index.

The decoder implementation can have a similar structure as the encoder. In an embodiment, the decoder can be configured to:

deduce from first bits of a binary representation an initial representative vector, compute the representative vector in the cell constituted by the initial representative vector from the remaining bits, and compute the complex representative from the real codeword.

The mathematical details are symmetric with respect to the encoder part with the same distinction between the three possible implementations.

The above-described feedback methods can be used e.g. for a single-antenna UE. A simple extension is to extend the method to multiple-antenna UE (denote the number of antennas at UE by N). In that case, the CSI to feedback can be a set of N unit-norm vectors. Typically, a preprocessing to compute these N unit-norm vectors has to be performed.

One can then separately encode the N vectors and feed back the corresponding bits through the aforementioned method.

The following table summarizes characteristics of prior art methods and an embodiment of the proposed method suitable for large codebooks of $2^B$ elements in a space of size D.

| Method | Available dimensions | Coding complexity in D and B | Efficiency (accuracy/bits) |
| --- | --- | --- | --- |
| Fourier codebook (Bell Labs) | low/high | Polynomial in D and B | Tends to 0 for large codebooks |
| Progressive refinement of codebooks via local codebooks (Huawei USA) | Low (D = $2^n$) | Polynomial in B | high |
| Lattice method-QAM/Reflected Simplex (Ryan et al.) | low/high | Exponential in B polynomial in D | high |
| Scalar quantization | low/high | Linear in D | low |
| Cube Split (our proposition) | low/high | Linear in D | high |

Embodiments of the present invention can have one or more of the following advantages:

Very low complexity of coding and decoding algorithm.
No storage needed at either BS and UE.
Performances competes with prior art.
Flexibility.
No parameterization or calibration needed.
Any precision can be reached.
Codebook available for any number of antennas.
Possible scaling with the number of antennas and the number of needed bits.

The foregoing descriptions are only implementation manners of the present invention, the scope of the present invention is not limited to this. Any variations or replacements can be easily made through person skilled in the art. Therefore, the protection scope of the present invention should be subject to the protection scope of the attached claims.

The invention claimed is:

1. An encoder for encoding a vector comprising channel state information, a pilot sequence, or both, the encoder comprising:

at least one processor; and
   a non-transitory computer-readable storage medium coupled to the at least one processor and storing programming instructions for execution by the at least one processor, wherein the programming instructions instruct the at least one processor to:

determine an initial cell of an initial sphere mesh, wherein the initial cell includes the vector and has a first identifier;

determine a refined sphere mesh based on the initial sphere mesh, wherein a refined cell of the refined sphere mesh includes the vector and has a second identifier; and determine a binary representation of the first identifier of the initial cell of the initial sphere mesh that includes the vector and the second identifier of the refined cell of the refined sphere mesh that includes the vector.

2. The encoder of claim 1, wherein the programming instructions instruct the at least one processor to determine the refined sphere mesh by iteratively splitting a cell of the initial sphere mesh.

3. The encoder of claim 1, wherein the programming instructions instruct the at least one processor to determine the refined sphere mesh by defining a grid on a cell of the initial sphere mesh.

4. The encoder of claim 1, wherein the vector is a complex-valued vector and the initial sphere mesh is a sphere mesh on a complex-valued sphere.

5. The encoder of claim 1, wherein the vector is a real-valued vector that is determined based on a complex input vector.

6. The encoder of claim 1, wherein the encoder is configured to determine a binary representation for each of a plurality of vectors comprising channel state information, pilot sequences, or both corresponding to a plurality of antennas of a multiple-antenna user equipment.

7. The encoder of claim 1, further comprising transmitter configured to transmit the binary representation over a wireless connection.

8. The encoder of claim 1, wherein the programming instructions instruct the at least one processor to determine the refined sphere mesh by refining only the initial cell including the vector among a plurality of initial cells of the initial sphere mesh.

9. The encoder of claim 1, wherein the initial sphere mesh comprises a plurality of initial cells, and the refined sphere mesh comprises a plurality of refined cells, and
wherein a number of the plurality of refined cells is larger than a number of the plurality of initial cells.

10. The encoder of claim 1, wherein the initial sphere mesh comprises a plurality of initial cells, and a center of each of the plurality of initial cells defines a respective codeword,
wherein the programming instructions instruct the at least one processor to determine the initial cell including the vector by determining that an initial codeword of the initial cell is closest to the vector among the respective codewords.

11. A decoder for decoding a vector comprising channel state information, a pilot sequence, or both from a binary representation, the decoder comprising:
at least one processor; and
a non-transitory computer-readable storage medium coupled to the at least one processor and storing programming instructions for execution by the at least one processor, wherein the programming instructions instruct the at least one processor to:
determine an initial cell vector based on a first part of the binary representation and an initial sphere mesh, the first part of the binary representation corresponding to a first identifier of an initial cell including the vector;

determine a refined sphere mesh based on the initial sphere mesh; and determine a refined cell vector based on the refined sphere mesh and a second part of the binary representation corresponding to a second identifier of a refined cell including the vector.

12. The decoder of claim 11, wherein the programming instructions instruct the at least one processor to determine the refined sphere mesh by refining only cells containing initial cell vectors among a plurality of cells of the initial sphere mesh.

13. The decoder of claim 11, wherein the programming instructions instruct the at least one processor to:
determine the refined sphere mesh by iteratively splitting a cell of the initial sphere mesh into two cells,
determine the refined sphere mesh by defining a grid on a cell of the initial sphere mesh, or both.

14. A method for encoding a vector comprising channel state information, a pilot sequence, or both, the method comprising:
determining an initial cell of an initial sphere mesh, wherein the initial cell includes the vector;
refining the initial sphere mesh to obtain a refined sphere mesh;
determining a refined cell of the refined sphere mesh that includes the vector; and
representing a first identifier of the initial cell and a second identifier of the refined cell as a binary representation.

15. The method of claim 14, wherein refining the initial sphere mesh comprises iteratively splitting a cell of the initial sphere mesh.

16. The method of claim 14, wherein the vector is a real-valued vector and the method comprises an initial step of converting a complex input vector into the real-valued vector.

17. A method for decoding a vector comprising channel state information, a pilot sequence, or both from a binary representation, the method comprising:
determining an initial cell vector based on a first part of the binary representation and an initial sphere mesh, the first part of the binary representation corresponding to a first identifier of an initial cell including the vector;
determining a refined sphere mesh based on the initial sphere mesh; and
determining a refined cell vector based on the refined sphere mesh and a second part of the binary representation corresponding to a second identifier of a refined cell including the vector.

18. A non-transitory computer-readable storage medium storing program code, the program code comprising instructions that when executed by at least one processor, wherein the program codes comprise instructions comprises:
determining an initial cell of an initial sphere mesh, wherein the initial cell includes a vector;
refining the initial sphere mesh to obtain a refined sphere mesh;
determining a refined cell of the refined sphere mesh that includes the vector; and
representing a first identifier of the initial cell and a second identifier of the refined cell as a binary representation.

19. The non-transitory computer-readable storage medium storing program code according to claim 18, wherein refining the initial sphere mesh comprises iteratively splitting a cell of the initial sphere mesh.

20. The non-transitory computer-readable storage medium storing program code according to claim 18, wherein the vector is a real-valued vector and the instructions comprise an initial step of converting a complex input vector into the real-valued vector.

* * * * *